United States Patent
Wolfeld et al.

(10) Patent No.: US 12,407,504 B2
(45) Date of Patent: Sep. 2, 2025

(54) LINK SAFETY GUARANTEE

(71) Applicant: Cisco Technology, Inc., San Jose, CA (US)

(72) Inventors: Jeffrey Wolfeld, Palo Alto, CA (US); Hancheng Hsiung, Fremont, CA (US); Ze Li, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 199 days.

(21) Appl. No.: 18/171,973

(22) Filed: Feb. 21, 2023

(65) Prior Publication Data
US 2024/0283643 A1    Aug. 22, 2024

(51) Int. Cl.
*H04L 9/08*    (2006.01)
*H04L 9/30*    (2006.01)
*H04L 9/32*    (2006.01)

(52) U.S. Cl.
CPC ............... *H04L 9/088* (2013.01); *H04L 9/30* (2013.01); *H04L 9/3247* (2013.01)

(58) Field of Classification Search
CPC .................................. H04L 9/088; H04L 9/30
See application file for complete search history.

(56) References Cited

U.S. PATENT DOCUMENTS

| | | | |
|---|---|---|---|
| 11,757,914 B1 * | 9/2023 | Jakobsson | H04L 51/42 726/25 |
| 2014/0059649 A1 | 2/2014 | Hu et al. | |
| 2016/0269420 A1 | 9/2016 | Hur | |
| 2018/0075256 A1 * | 3/2018 | Robinson | H04L 63/1466 |
| 2019/0103961 A1 * | 4/2019 | Chhabra | H04L 9/0838 |
| 2020/0137110 A1 * | 4/2020 | Tyler | H04L 63/1483 |
| 2020/0358798 A1 * | 11/2020 | Maylor | H04L 63/1433 |
| 2022/0210146 A1 | 6/2022 | Dhanabalan et al. | |
| 2024/0015182 A1 * | 1/2024 | Kim | H04L 63/1416 |
| 2024/0267410 A1 * | 8/2024 | Gorter | H04L 63/1483 |

FOREIGN PATENT DOCUMENTS

| | | | | |
|---|---|---|---|---|
| CN | 110032895 A | 7/2019 | | |
| WO | 2022159085 A1 | 7/2022 | | |
| WO | WO-2022145501 A1 * | 7/2022 | ............. | G06F 21/56 |

OTHER PUBLICATIONS

Google Cloud, "Using the Lookup API," Web Risk, Documentation, Guides, https://cloud.google.com/web-risk/docs/lookup-api, retrieved from the Internet Feb. 9, 2023, 4 pages.
Wikipedia, "JSON Web Signature," https://en.wikipedia.org/wiki/JSON_Web_Signature, retrieved from the Internet Feb. 9, 2023, 2 pages.
Google Cloud, "Web Risk," https://cloud.google.com/web-risk, retrieved from the Internet Feb. 9, 2023, 6 pages.

* cited by examiner

*Primary Examiner* — Esther B. Henderson
(74) *Attorney, Agent, or Firm* — Edell, Shapiro & Finnan, LLC

(57) ABSTRACT

Presented herein are techniques in which a user device verifies the safety of a link to a resource. A first user device receives a link to a resource and transmits a request to a client link service to determine whether the link is safe. The first user device receives a response indicating that the link is safe and including a link safety guarantee. The first user device transmits the link and the link safety guarantee to one or more second user devices.

20 Claims, 9 Drawing Sheets

LINK SAFETY GUARANTEE

TECHNICAL FIELD

The present disclosure relates to guaranteeing the safety of links to resources.

BACKGROUND

User devices can confirm the safety of web links that are received at the user devices by sending a request to a web risk service to verify the safety of the link. If the link is safe, the user device allows a user to click on the link to access resources. Verifying the safety of each link with the web risk service can be expensive and uses valuable resources.

DESCRIPTION OF EMBODIMENTS

Overview

Figure 1:
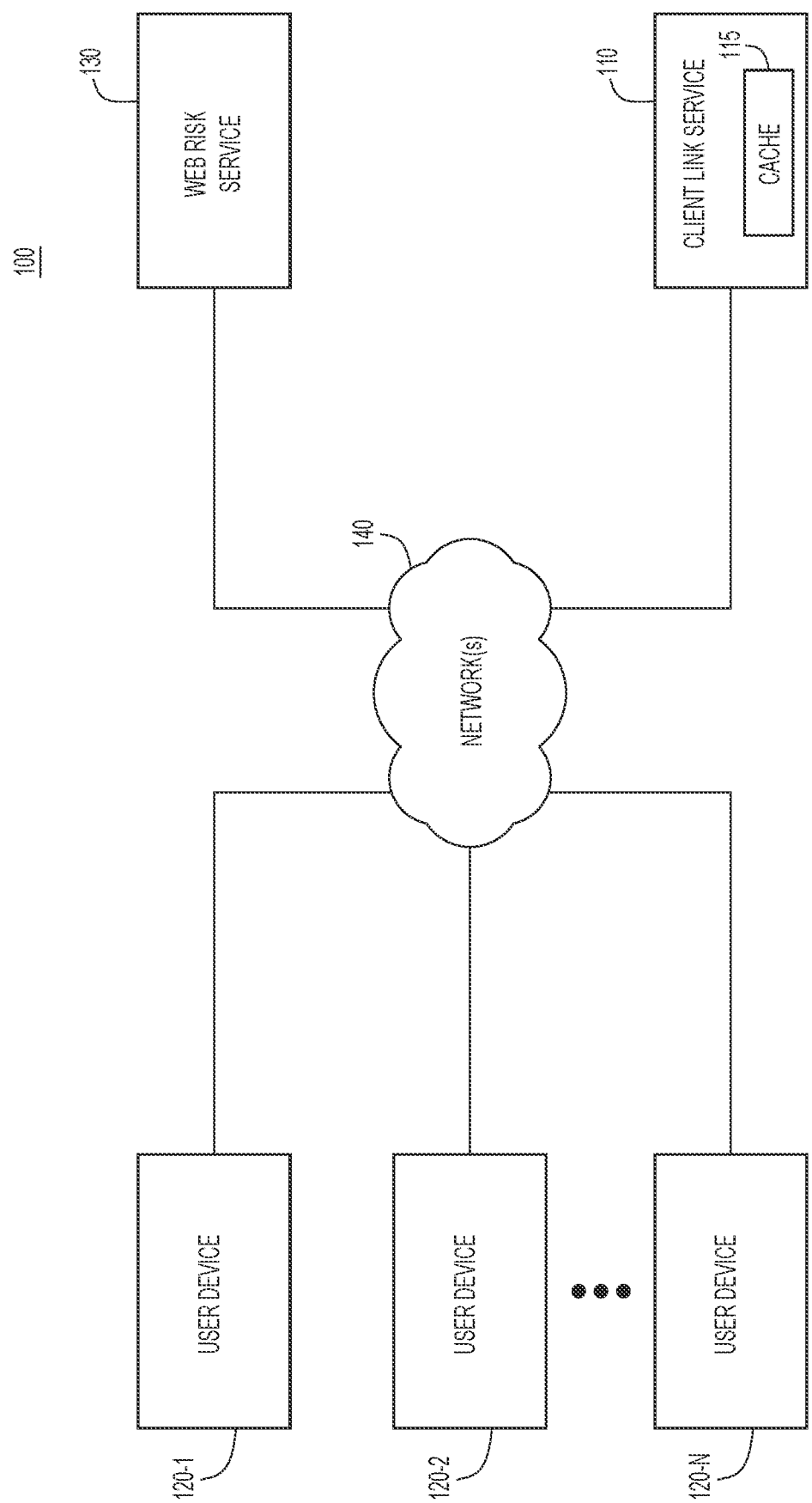
FIG. 1 is a block diagram of a system configured to verify the safety of a link to a resource and generate a link safety guarantee when the link is safe, according to an example embodiment.

Presented herein are systems and methods for requesting that the safety of a link be verified and transmitting a link safety guarantee with the link when the link is verified to be safe. The methods involve receiving, at a first user device, a link to a resource; transmitting, by the first user device, a request to a client link service to determine whether the link is safe; receiving, at the first user device, a response indicating that the link is safe and including a link safety guarantee; and transmitting the link and the link safety guarantee to one or more second user devices.

Presented herein additionally are systems and methods for verifying the safety of a link and generating a link safety guarantee when the link is safe. The methods involve receiving, from a user device, a request to verify that a link to a resource is safe; determining whether a data store includes an entry associated with the link; determining that the link is safe when the data store includes the entry associated with the link; generating a link safety guarantee when it is determined that the link is safe; and transmitting the link safety guarantee to the user device.

EXAMPLE EMBODIMENTS

Users of applications, such as online meeting applications, messaging applications, or other communications applications, may post web links to one another using the application. When a user posts a link using the application, a user device that receives the posted link may verify the safety of the link by sending a request to a web risk service via an application programming interface (API). If the user device receives an indication from the web risk service that the link is safe, the client device posts the unfurl content for the user to see and the user is permitted to click on the link. If an application is being used by many users, it may become expensive to repeatedly verify the safety of each link posted. For example, the web risk service may charge a fee for each link safety verification request. If a user posts a link to multiple users, each user device that receives the link may transmit the request to the web risk service to verify the safety of the link. In addition, resources such as network bandwidth, central processing unit (CPU) and battery life may be used verifying the safety of the links.

Embodiments described herein provide for a user device ("sending device") to verify the safety of a link with a client link service prior to sending the link to other user devices ("receiving devices"). When the sending device verifies the safety of the link, the link is transmitted to the receiving devices with a link safety guarantee. When the receiving devices receive the link safety guarantee, the receiving devices are able to identify the link as safe by verifying the link safety guarantee without transmitting a request to the web risk service to verify the safety of the link.

Embodiments described herein provide for a client link service that receives the request to verify the safety of the link from the sending device and generates the link safety guarantee when the link is safe. In some embodiments, the client link service may verify the safety of the link using a local cache that stores entries associated with links that have been verified as safe by the web risk service. In some embodiments, the client link service may verify the safety of the link by transmitting a request to the web risk service. For example, the client link service may transmit a request to the web risk service if an entry associated with the link does not exist in the cache or if an entry associated with the link has expired.

According to some embodiments, the link safety guarantee is signed by a private key that is owned by the client link service. The receiving devices may verify the signature of the link safety guarantee received with a link by using a public key associated with the client link service. The link safety guarantee may include an expiration timestamp indicating when the link safety guarantee expires. According to some embodiments, if the link safety guarantee for a link has expired, the receiving devices may transmit a request to the client link service to verify whether the link is safe.

Reference is first made to FIG. 1. FIG. 1 shows a block diagram of a system 100 that is configured to provide a link safety guarantee when the safety of a link is verified. The system 100 includes a client link service 110, a plurality of user devices 120-1 to 120-N (sometimes referred to herein singularly as user device 120 or collectively as user devices 120) that communicate with client link service 110 via one or more networks 140, and a web risk service 130.

Client link service 110 may proxy client requests for link safety verification to web risk service 130 while optimizing the process of link safety verification. Client link service 110 includes a cache 115 for storing entries associated with links that are verified as safe. When a link is verified as safe, client link service 110 may store an entry for the link in cache 115 with an expiration. When the client link service 110 receives a request to verify the safety of a link, the client link service 110 may first perform a lookup in cache 115 to determine whether an entry associated with the link is stored in cache 115. If there is no entry associated with the link in cache 115 or the entry associated with the link in cache 115 has expired, client link service 110 may transmit a request to web risk service 130 to verify the safety of the link.

A user device 120 may be a tablet, laptop computer, desktop computer, Smartphone, virtual desktop client, or any user device now known or hereinafter developed that can connect to client link service 110. User device 120 may have a dedicated physical keyboard or touch-screen capabilities to provide a virtual on-screen keyboard to enter text.

According to embodiments described herein, users of user devices 120-1 to 120-N may communicate via, for example, an application (e.g., an online meeting application, a messaging application, a communications application, etc.). In the example illustrated in FIG. 1, a user of user device 120-1 may insert or post a link in an interface associated with the application for transmitting the link to user devices 120-2 to 120-N. When the user inserts or posts the link and prior to transmitting the link to user devices 120-2 to 120-N, user device 120-1 may send a request to client link service 110 to verify the safety of the link.

Client link service 110 may receive the request to verify the safety of the link from user device 120-1. Client link service 110 may perform a lookup in cache 115 to determine whether cache 115 stores an entry associated with the link. If cache 115 stores an entry associated with the link and the entry has not expired, client link service 110 may determine that the link is safe and may generate a link safety guarantee for the link.

If cache 115 does not store an entry associated with the link or if cache 115 stores an entry for the link that has expired, client link service 110 may transmit a request to web risk service 130 to verify the safety of the link. To send a request to the web risk service 130, client link service 110 may transmit an HTTP GET request. The HTTP GET request may include a bearer token, a set of threat types to check (e.g., THREAT_TYPE_UNSPECIFIED, MALWARE, SOCIAL ENGINEERING, and UNWANTED_SOFTWARE), and the Uniform Resource Locator (URL) of the link whose safety is being verified. If web risk service 130 verifies the safety of the link, client link service 110 may generate a link safety guarantee for the link.

If the web risk service 130 cannot verify that the link is safe or if web risk service 130 indicates that the link is not safe, client link service 110 may transmit a message to user device 120-1 indicating that the link is unsafe. An unsafe link may either not be displayed or may be displayed in a way so as to be unclickable and unable to be copied, with an indication that the link has been determined to be unsafe.

The link safety guarantee generated by the client link service 110 for a safe link may be a JSON Web Signature (JWS) signed by a private key that is owned by the client link service 110. The JWS includes a urlHash, an expiration, and a signature. The urlHash includes a SHA-256 of the URL of the link that was verified as safe. The expiration includes a timestamp indicating when the guarantee expires (e.g., in milliseconds since the epoch). The signature is created using the private key associated with the client link service 110.

The client link service 110 may transmit the link safety guarantee to user device 120-1. When a URL or link is posted in an application, the link is entered or written into the activity object of the application in the form of a Hypertext Markup Language (HTML) element. For example, the link "http://link-in-question" would be entered or written as <A HREF="http://link-in-question">. The link guarantee for the link would then be inserted into the HTML element as an attribute: <A HREF="http://link-in-question" guarantee="the-jws">. User device 120-1 may transmit the link and the link safety guarantee to user devices 120-2 to 120-N via the activity object.

When a user device (e.g., user device 120-2) attempts to display an activity object containing the link, user device 120-2 may determine whether the link is safe. If the link contains a link safety guarantee, user device 120-2 may verify the JWS signature using a public key associated with client link service 110. If the signature can be verified and the guarantee has not expired, user device 120-2 displays the link (e.g., in a manner such that the link may be selected, copied, or otherwise selected). If the signature cannot be verified or if the guarantee has expired, user device 120-2 may verify the link by sending a link verification request to client link service 110.

When a link is in the process of being verified (e.g., by a user device 120 or the client link service 110), the link will display as an unsafe link (e.g., the link cannot be selected or copied), but an indication will show that link safety is being verified. Links that were once considered safe, but whose link safety guarantee has expired may still be displayed and the link safety does not have to be verified every time the links are displayed. According to some embodiments, if a user selects or attempts to copy a link whose link safety guarantee has expired, the user device associated with the user may send a request to client link service 110 to determine whether the link is safe before carrying out the requested activity.

Figure 2:
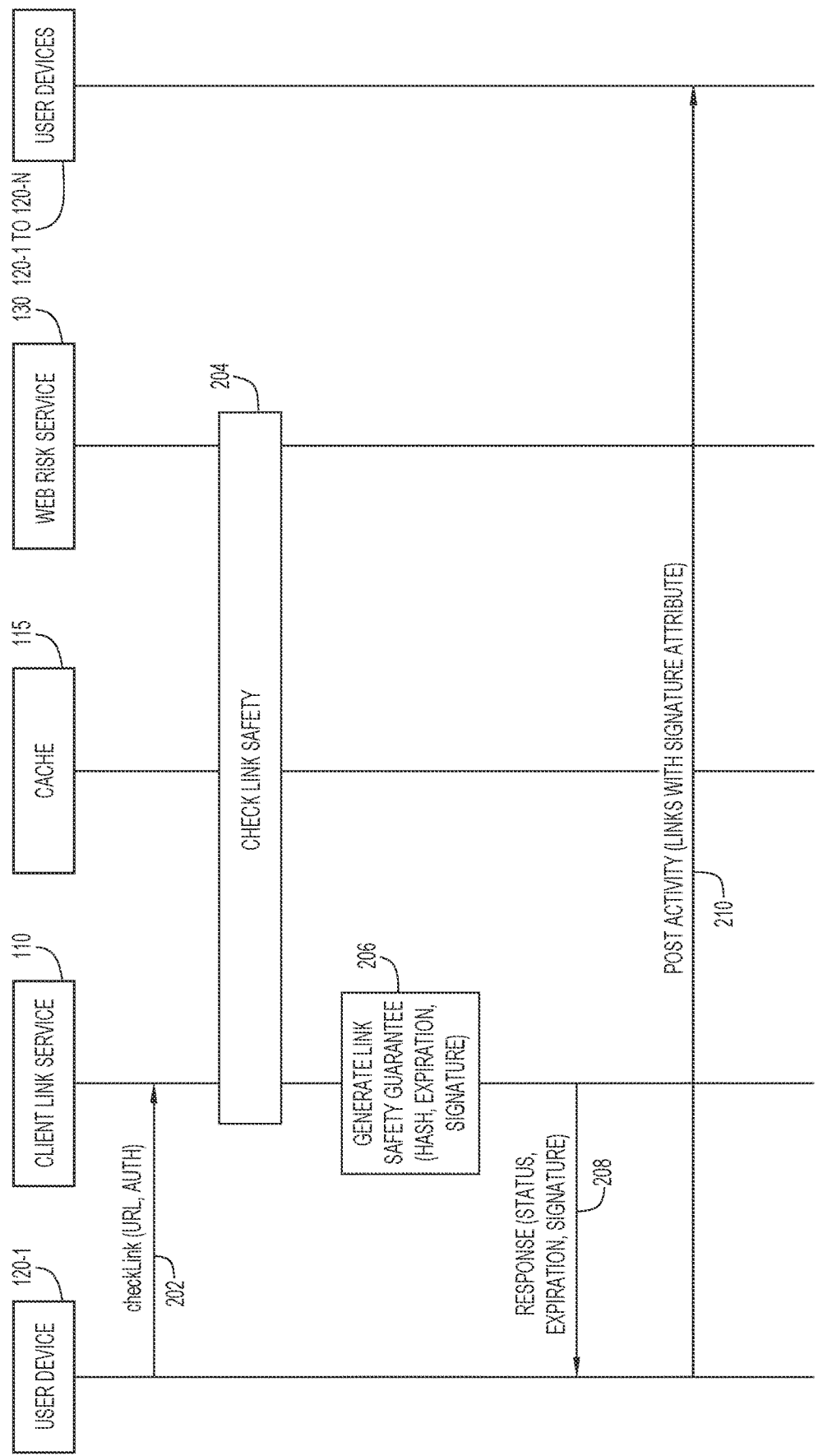
FIG. 2 is a message sequence diagram illustrating a method of verifying the safety of a link and generating a link safety guarantee, according to an example embodiment.

Reference is now made to FIG. 2. FIG. 2 is a message sequence diagram depicting a method of verifying the safety of a link and transmitting the link with a link safety guarantee, according to an example embodiment. The method described in FIG. 2 may be performed, for example, by user devices 120-1 to 120-N, client link service 110, and web risk service 130.

In the example illustrated in FIG. 2, a user of user device 120-1 may enter or write a link or URL into user device 120-1 for transmitting to user devices 120-1 to 120-N (e.g., via a communications application). At 202, prior to transmitting the link to user devices 120-1 to 120-N, user device 120-1 transmits a checkLink message to client link service 110 as a request to verify the safety of the link. The checkLink message includes the URL of the link that is being verified and authentication information. For example, the API request to client link service 110 may use a valid CI token or an anonymous token. A command POST/checkLinks may be used to request the link safety check. As an example, to request a link safety check for a batch of URLs (e.g., url1, url2, . . . urln), a POST/checkLinks request may be transmitted to client link service 110 and a body of the request to verify the safety of the links may have the following form:

```
{
    "urls":
    [
        "url1":
        "url2":
        "urln"
    ]
}
```

At 204, client link service 110 may check the safety of the link. For example, client link service 110 may perform a lookup to determine if an entry corresponding to the link is stored in cache 115. If an entry corresponding to the link is stored in cache 115 and the entry has not expired, client link service 110 may verify that the link is safe. If cache 115 does not store an entry associated with the link or if the entry associated with the link has expired, client link service 110 may transmit a request to web risk service 130 to determine whether the link is safe. Client link service 110 may receive an indication from web risk service 130 that the link is safe. In some embodiments, client link service 110 may store an entry corresponding to the link in cache 115 based on receiving the indication from web risk service 130 that the link is safe. The entry may include an expiration timestamp indicating when the entry expires.

At 206, client link service 110 may generate a link safety guarantee when the link is safe. The link safety guarantee may be a JWS signed by a private key associated with the client link service 110. The JWS may include a hash of the URL, a timestamp indicating an expiration of the guarantee, and a signature created using the private key associated with the client link service 110.

At 208, client link service 110 may transmit a response to user device 120-1 indicating whether the safety of the link has been verified. In this example, the link has been determined to be safe and the response includes the status, expiration, and signature of the link safety guarantee. In this example, the response status may be "200 OK," indicating that the link is safe. When URLs URL1 to URLn have been verified as safe, the body of the response may have the form:

```
{
    "url1": { "jwt": "<jwt>": "safe": <true/false> },
    "url2": { "jwt": "<jwt>": "safe": <true/false> },
    "urln": { "jwt": "<jwt>": "safe": <true|false> }
}
``` where <jwt> is:

```
{
    "header":
    {
      "alg": "HS256": "typ": "JWT"
    },
    "payload":
    {
        "sub": "<the-url-hash>": "iat": "<check-date>":
        "exp": "<expiration-date>"
    },
    "signature": "<signature>"
}
```

The JWT shown above is optional. Absence of the JWT indicates that user device 120-1 will be unable to pass the safety guarantee to other clients.

At 210, user device 120-1 transmits the link and the link safety guarantee to user devices 120-1 to 120-N. For example, the user device 120-1 may post or write the link and the link safety guarantee to an activity object of the application for transmission to user devices 120-1 to 120-N. As described above, the URL of the link may be entered into the activity object in the form of an HTML element and the link safety guarantee may be inserted into the HTML element as an attribute.

Although not shown in FIG. 2, if the link is not safe, client link service 110 may send user device 120-1 a message indicating the link is not safe. User device 120-1 may display a message indicating that the link is not safe and prevent the link from being posted to the activity object.

Figure 3:
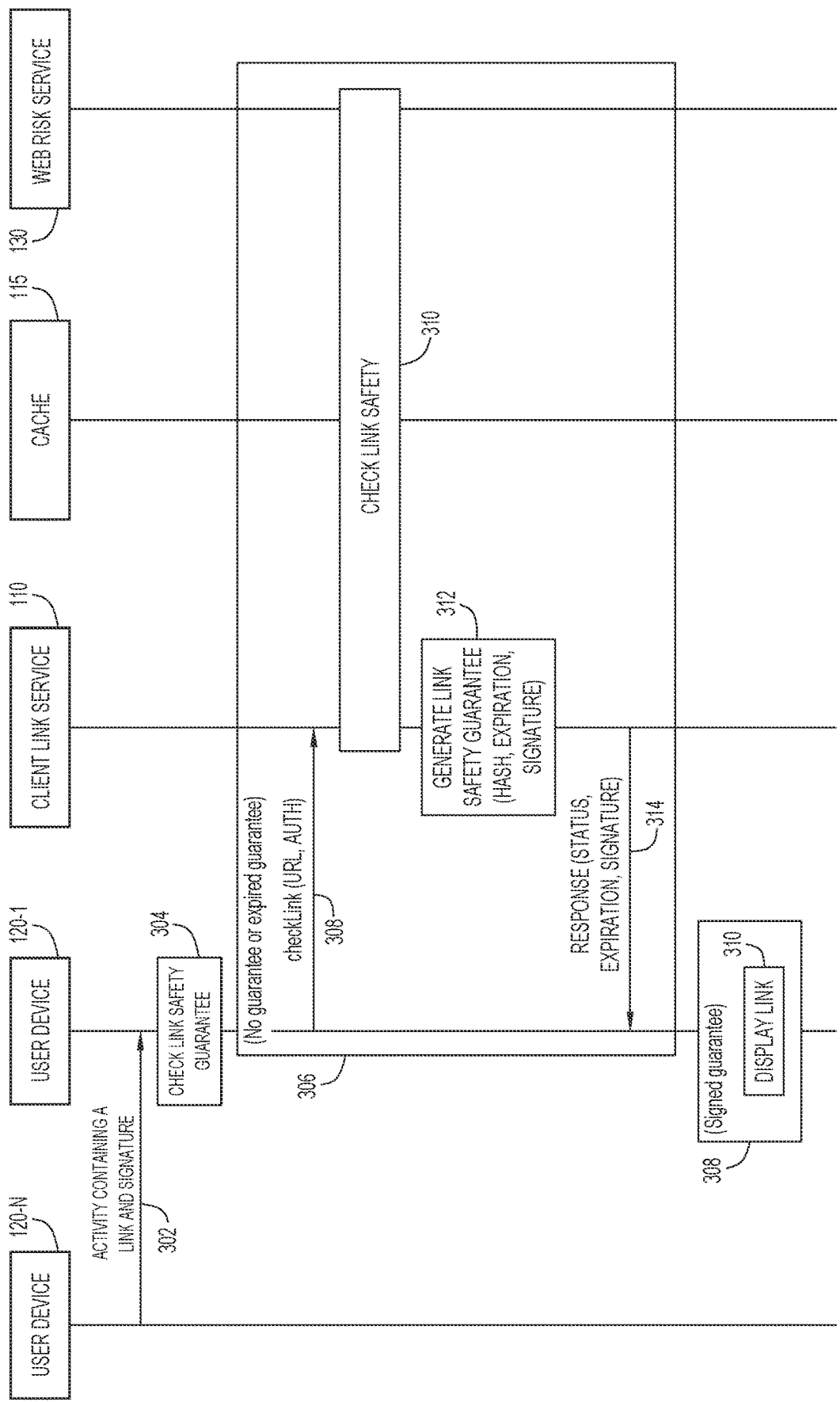
FIG. 3 is a message sequence diagram illustrating a method of verifying a link safety guarantee, according to an example embodiment.

Reference is now made to FIG. 3. FIG. 3 is a message sequence diagram illustrating a method of checking a link safety guarantee when a user device receives a link, according to an example embodiment. The method described in FIG. 3 may be performed, for example, by user devices 120-1 to 120-N, client link service 110, and web risk service 130.

At 302, user device 120-1 receives an activity from user device 120-N. The activity includes a link and a signature, such as a link safety guarantee. User device 120-1 may display the link. A user of user device 120-1 may attempt to perform an action with respect to the link (e.g., select the link, copy the link, click on the link, etc.), and, at 304, user device 120-1 may check the link safety guarantee. For example, user device 120-1 may check the link safety guarantee to determine whether the link safety guarantee exists and, if the link safety guarantee exists, whether the link safety guarantee has expired. If there is no link safety guarantee or if the link safety guarantee has expired, processing continues as shown in box 306. If the link safety guarantee exists and has not expired, processing continues as shown in box 308.

The method described with respect to box 306 is similar to the method described above with respect to FIG. 2. At 308, user device 120-1 transmits a checkLink request to client link service 110 in a similar manner as described in 202 of FIG. 2. The checkLink request includes authorization information and the URL of the link to check. At 310, client link service 110 performs a link safety verification in a manner similar to 204 of FIG. 2. For example, client link service 110 performs a lookup in cache 115 to determine whether cache 115 includes an entry corresponding to the link that has not expired. If cache 115 does not include an entry corresponding to the link or if the entry has expired, client link service 110 sends a request to web risk service 130 to perform the link safety verification.

At 312, client link service 110 generates a link safety guarantee when the link has been verified as safe. Client link service 110 generates the link safety guarantee in a manner similar to 206 in FIG. 2. The link safety guarantee includes a hash of the URL of the link, an expiration timestamp, and a signature signed by a private key associated with client link service 110. At 314, client link service 110 transmits a response to user device 120-1 in a manner similar to 208 in FIG. 2. The response includes a status, an expiration timestamp, and a signature. When user device 120-1 receives the response, user device 120-1 displays the link so that the link may be selected or copied.

If the link includes a link safety guarantee that has not expired, processing continues to box 308. User device 120-1 uses a public key associated with the client link service 110 to verify the signature of the link safety guarantee. User device 120-1 may use a GET/publicKeys command to obtain a public key for verifying the signature. There may be several keys in the returned array, in order to accommodate key rotation. The first entry represents the current key associated with client link service 110 and the following keys represent previous keys in reverse chronological order. Each entry indicates when the key was put into effect. When verifying a signature, user device 120-1 may use the first key whose startDate precedes the checkDate of the link.

Entries are added to the list of keys when the keys are rotated. Entries age out after a period of time. In some embodiments, the list of keys does not contain more than two or three entries. The client may request the current list of public keys at login time or when the user selects a space in a cluster that has not been viewed before. The client-link service may use an Elliptical Curve Keys Secrets pattern to create, maintain, and rotate the keys.

When user device 120-1 uses the GET/publicKeys command to obtain public keys, user device 120-1 may receive a response status of "200 OK" and a response body that looks like:

```
{
    "clusterId": "<clusterId>",
    "keys": [
        { "startDate": "<startDate>": "publicKey": "<key>" },
        // ...
    ]
}
```

When user device 120-1 has verified the signature using the public key, at 310, user device 120-1 displays the link in a manner such that the requested action may be performed. For example, the link is displayed so that the link may be copied, clicked on, or otherwise selected. User device 120-1 may perform the selected action requested by the user.

Figure 4:
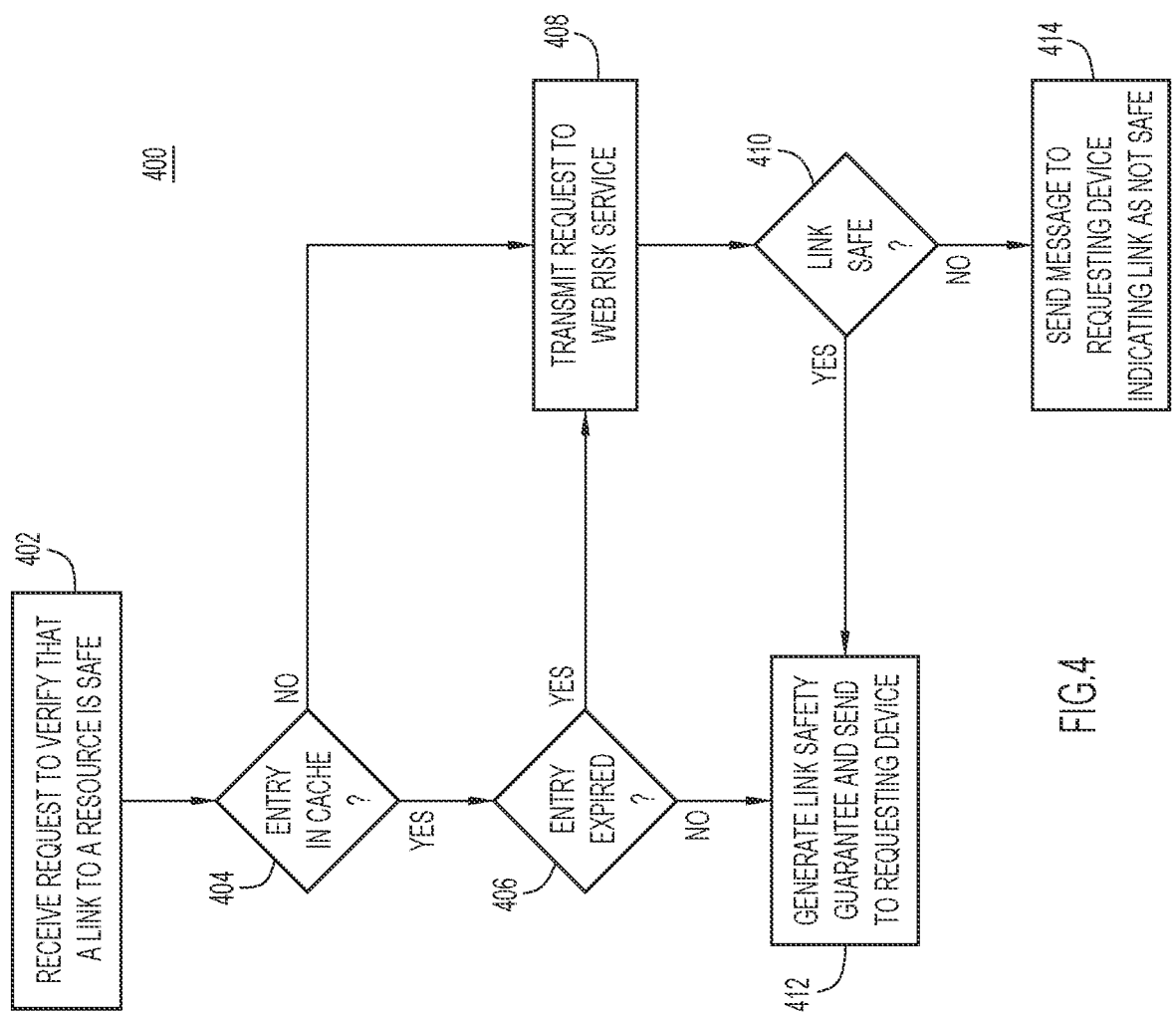
FIG. 4 is a flow diagram illustrating a method of verifying the safety of a link at a client link service, according to an example embodiment.

Reference is now made to FIG. 4. FIG. 4 is a flow diagram of a method 400 of verifying that a link is safe. Method 400 may be performed, for example, by client link service 110.

At 402, client link service 110 may receive a request to verify that a link to a resource is safe. The request may be received from a user device, such as user device 120-1, and the request may include the link and authorization information (e.g., authorization information associated with a user of user device 120-1). At 404, client link service 110 may determine whether cache 115 stores an entry corresponding to the link. If cache 115 stores an entry corresponding to the link, at 406, client link service 110 determines whether the entry has expired. If the entry has expired or if cache 115 does not store a link corresponding to the entry, at 408, client link service 110 transmits a request to web risk service 130 to verify whether the link is safe.

At 410, client link service 110 receives a message from web risk service 130 indicating whether the link is safe. If the message indicates that the link is safe or if the entry corresponding to the link in cache 115 has not expired, at 412, client link service 110 generates a link safety guarantee for the link and transmits the link safety guarantee to the requesting user device (e.g., user device 120-1). As discussed previously, the link safety guarantee includes a hash of the URL of the link, an expiration timestamp, and a signature created using a private key associated with client link service 110. If the message from web risk service 130 indicates that the link is not safe, at 414, client link service 110 may send a message to the requesting user device (e.g., user device 120-1) indicating that the link is unsafe.

Figure 5:
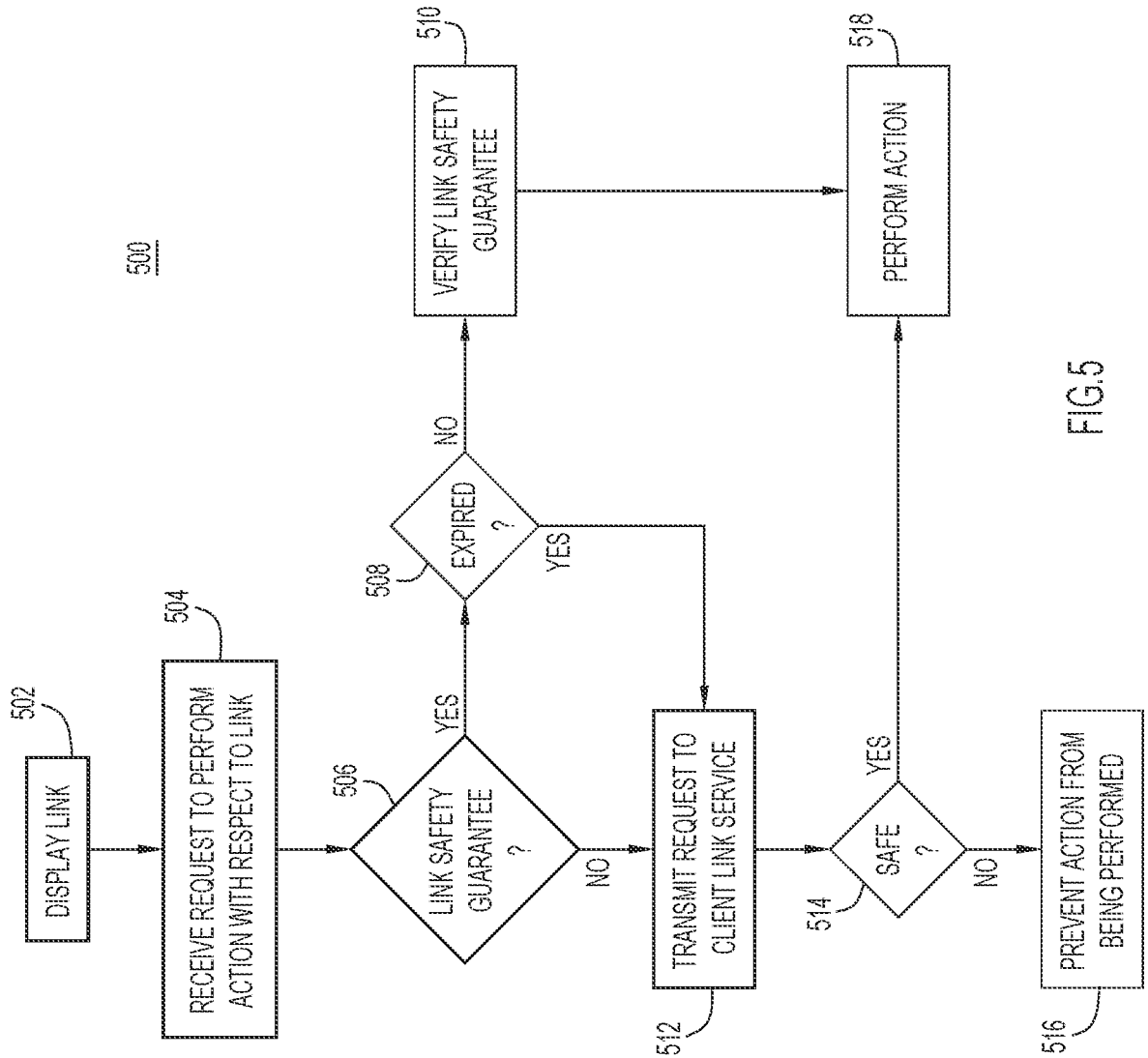
FIG. 5 is a flow diagram illustrating a method of verifying a link safety guarantee at a user device, according to an example embodiment.

Reference is now made to FIG. 5. FIG. 5 is a flow diagram of a method 500 of verifying whether a received link is safe. Method 500 may be performed, for example, by a user device, such as user device 120-1.

At 502, user device 120-1 may display a received link. The link may have been received, for example, from another user device in an activity object associated with an application. User device 120-1 may display the link in a way such that the link may not be clicked on, copied, or otherwise selected without verifying that the link is safe. At 504, a request is received to perform an action with respect to the link. For example, a user may have clicked on or attempted to copy or otherwise select the link.

At 506, user device 120-1 may determine whether a link safety guarantee associated with the link has been received. For example, a URL corresponding to the link may be included in an HTML element of the activity object and a link safety guarantee may be inserted into the HTML element as an attribute. If the link includes a link safety guarantee, at 508, user device 120-1 determines whether the link safety guarantee has expired. If the link safety guarantee has not expired, at 510, user device 120-1 may verify the link safety guarantee. For example, the user device 120-1 may verify the link safety guarantee using a public key associated with client link service 110.

If the link safety guarantee has expired or the link does not include a link safety guarantee, at 512, user device 120-1 transmits a request to client link service 110 to verify the safety of the link. At 514, user device 120-1 may receive a message from client link service 110 indicating whether the link is safe. If the message indicates that the link is safe or if user device 120-1 verified the link safety guarantee, at 518, user device 120-1 performs the action with respect to the link. For example, if the link is safe, user device 120-1 may navigate to the resource associated with the link, allow the user to copy or select the link, or perform another action with respect to the link. If the link is not safe, at 516, user device 120-1 prevents the action from being performed. For example, user device 120-1 does not allow the user to select or copy the link. In some embodiments, user device 120-1 may display a message indicating that the link is unsafe.

Figure 6:
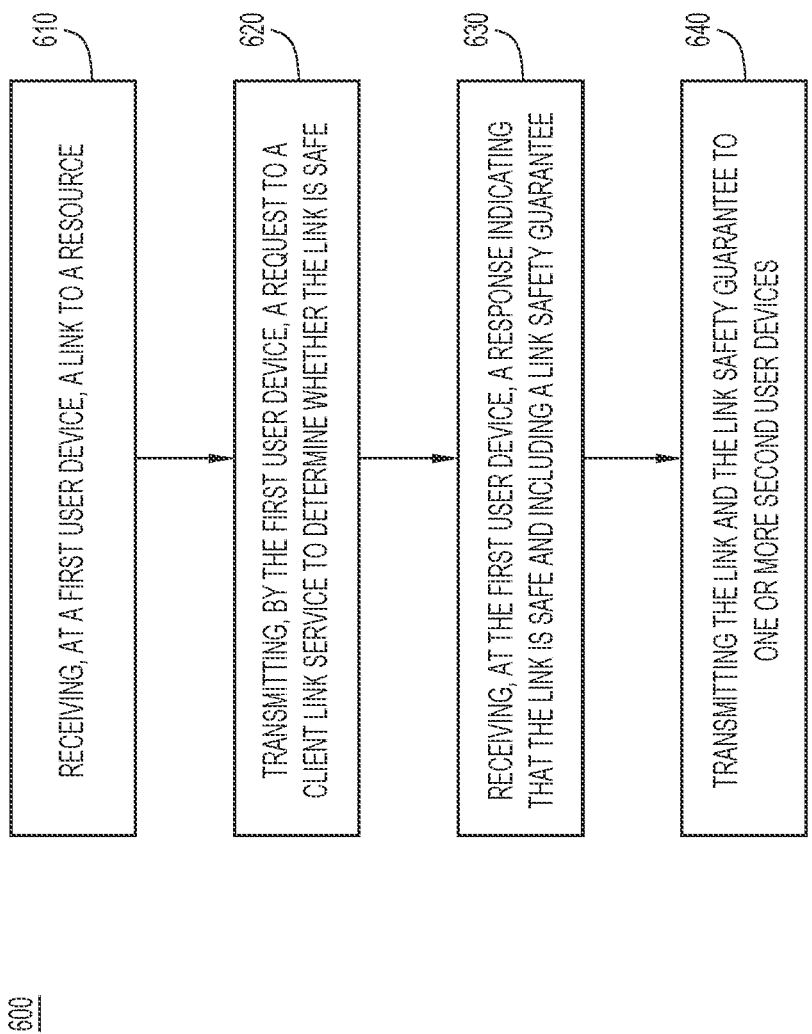
FIG. 6 is a flow diagram illustrating a method of receiving a link safety guarantee when a link is verified as safe, according to an example embodiment.

Reference is now made to FIG. 6. FIG. 6 is a flow diagram illustrating a method 600 of verifying the safety of a link to a resource. The method 600 may be implemented by a user device, such as user device 120-1 in combination with other devices, such as client link service 110, web risk service 130, and/or other user devices 120-2 to 120-N.

At 610, the method 600 involves receiving, at a first user device, a link to a resource. For example, a user of user device 120-1 may insert a link or a URL for sharing with other users via, for example, a communications application. At 620, the method 600 involves transmitting, by the first user device, a request to a client link service to determine whether the link is safe. For example, user device 120-1 may transmit the URL and authorization information to client link service 110 with a request to verify the safety of the link.

At 630, the method 600 involves receiving, at the first user device, a response indicating that the link is safe. The response includes a link safety guarantee associated with the link. At 640, the method 600 involves transmitting the link and the link safety guarantee to one or more second user devices. For example, the URL may be posted or written into an activity object associated with the application in the form of an HTML element and the link safety guarantee may be inserted into the HTML element as an attribute. The activity object including the URL of the link and the link safety guarantee may be transmitted to other user devices, such as user devices 120-2 to 120-N.

Figure 7:
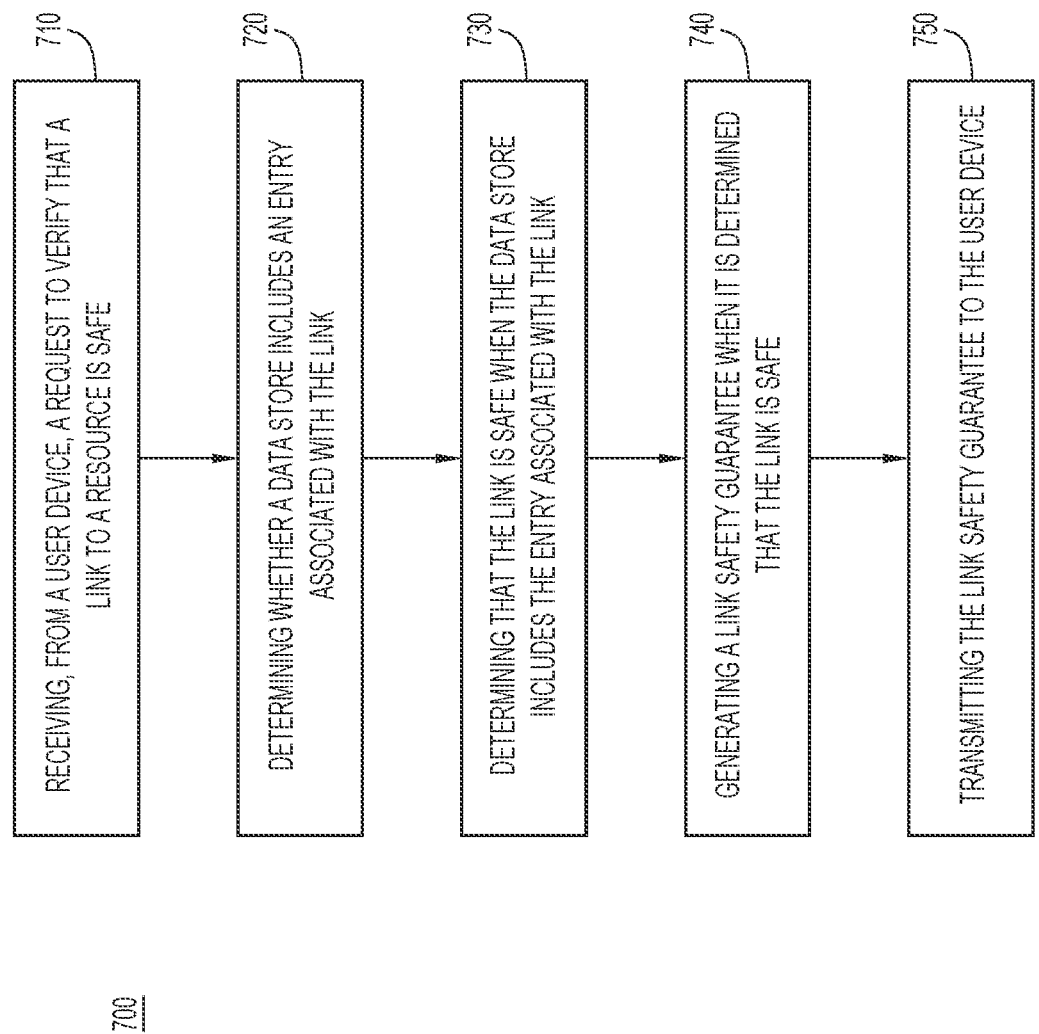
FIG. 7 is a flow diagram illustrating a method of verifying the safety of a link when an entry associated with the link is stored in a data store, according to an example embodiment.

Reference is now made to FIG. 7. FIG. 7 is a flow diagram illustrating a method 700 of verifying the safety of a link to a resource. The method 700 may be implemented by client link service 110 in conjunction with other devices, such as user device 120 and web risk service 130.

At 710, the method 700 involves receiving, from a user device, a request to verify that a link to a resource is safe. For example, client link service 110 may receive a request from user device 120-1 to verify the safety of a link. The request may include authentication information and a URL of the link.

At 720, the method 700 involves determining whether a data store includes an entry associated with the link. For example, client link service 110 performs a lookup to determine whether cache 115 stores an entry corresponding to the link.

At 730, the method 700 includes determining that the link is safe when the data store includes the entry associated with the link. In some embodiments, the client link service 110 may determine that the link is safe if cache 115 stores an entry corresponding to the link. In some embodiments, client link service 110 may determine whether the entry has expired and determine that the link is safe if the entry has not expired.

At 740, the method 700 involves generating a link safety guarantee when it is determined that the link is safe. As discussed above, the link safety guarantee includes an expiration timestamp and a signature signed by a private key of client link service 110.

At 750, the method 700 involves transmitting the link safety guarantee to the user device. For example, client link service 110 may transmit the link safety guarantee to user device 120-1 with an indication that the link is safe.

Figure 8:
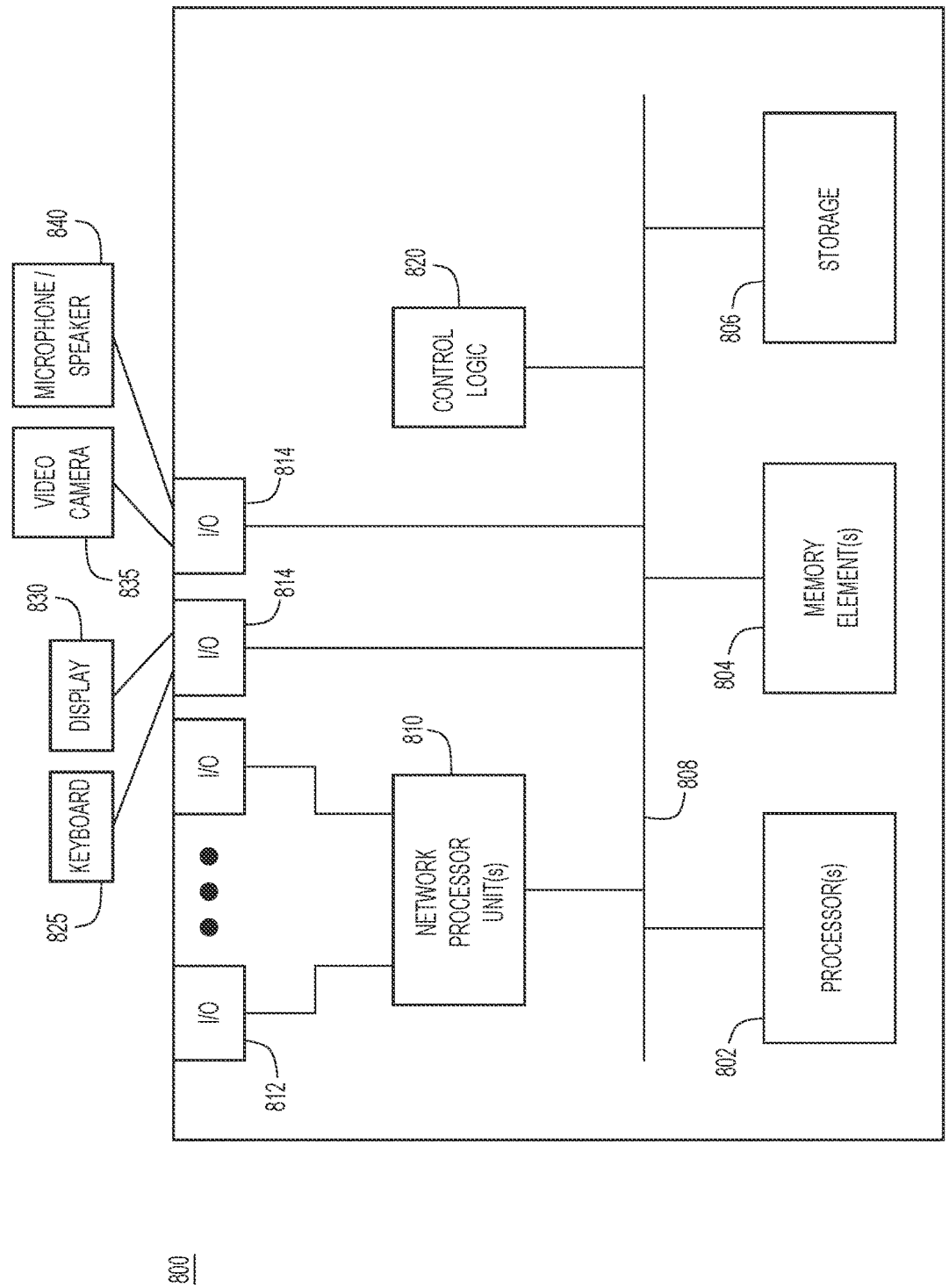
FIG. 8 is a hardware block diagram of a computer device that may be configured to perform the operations involved in transmitting a request to verify the safety of a link or verifying a link safety guarantee, according to an example embodiment.

Referring to FIG. 8, FIG. 8 illustrates a hardware block diagram of a computing/computer device 800 that may perform functions of a user device associated with operations discussed herein in connection with the techniques depicted in FIGS. 1-7. In various embodiments, a computing device, such as computing device 800 or any combination of computing devices 800, may be configured as any devices as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard 825, display 830, keypad, a touch screen, and/or any other suitable input and/or output device now known or hereafter developed. This may be the case, in particular, when the computer device 800 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computer device 800 serves as a user device as described herein. Additional external devices may include a video camera 835 and microphone/speaker combination 840.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 9:
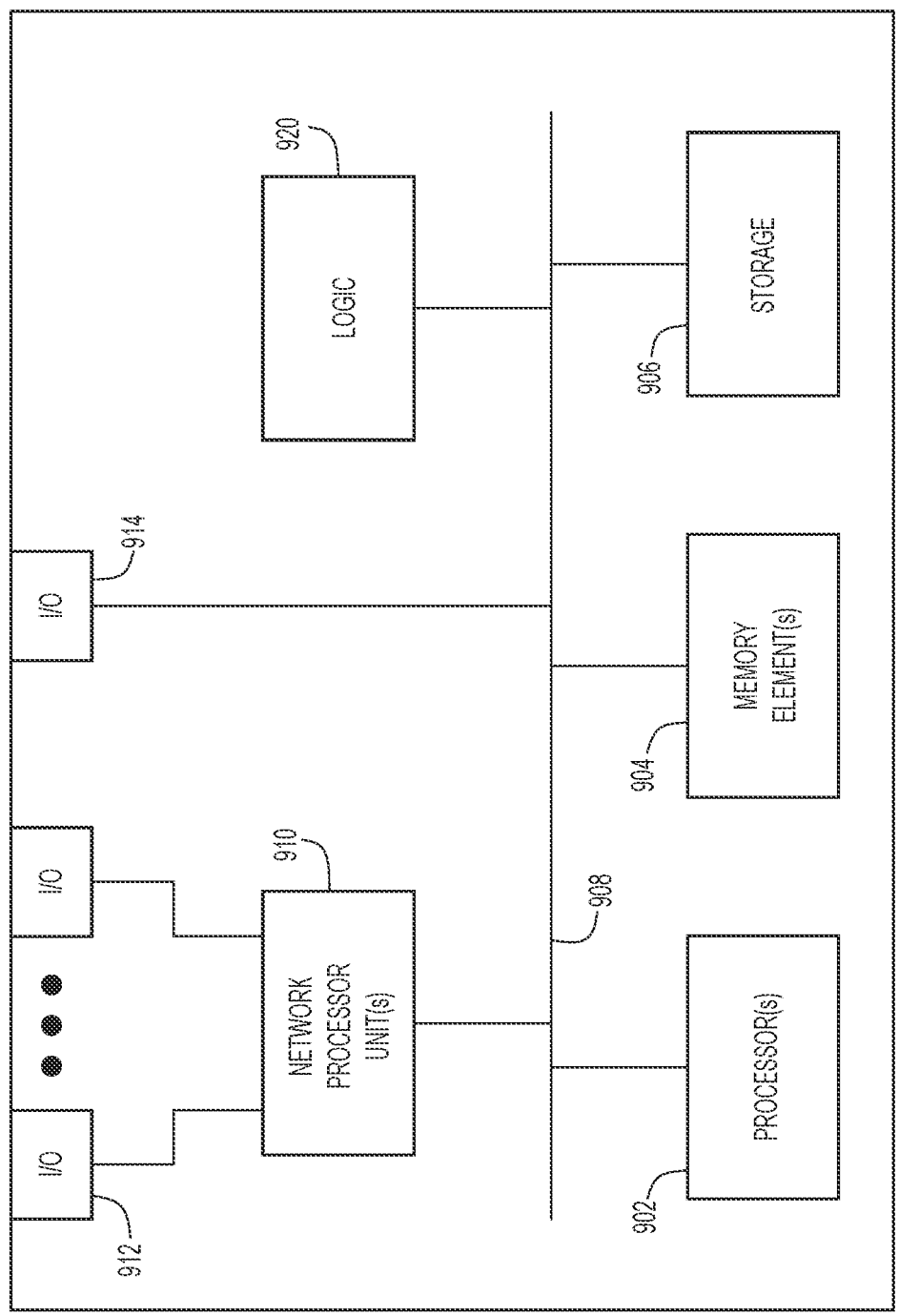
FIG. 9 is a hardware block diagram of a computer device that may be configured to perform the client link service operations involved in verifying the safety of a link, according to an example embodiment.

FIG. 9 illustrates a block diagram of a computing device 900 that may perform the functions of the client link service 110 described herein. The computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and meeting server logic 920. In various embodiments, instructions associated with the logic 920 is configured to perform the client link service operations described herein, including those depicted by the flow chart for method 400 shown in FIG. 4 and method 700 shown in FIG. 7.

In one form a method is provided including receiving, at a first user device, a link to a resource; transmitting, by the first user device, a request to a client link service to determine whether the link is safe; receiving, at the first user device, a response indicating that the link is safe and including a link safety guarantee; and transmitting the link and the link safety guarantee to one or more second user devices.

In one example, the link safety guarantee includes a signature signed by a private key associated with the client link service. In another example, the one or more second user devices verify the signature using a public key associated with the client link service. In another example, transmitting the link and the link safety guarantee includes transmitting the link and including the link safety guarantee as an additional element when transmitting the link. In another example, the method further includes displaying the link so that the link is selectable when the link is safe. In another example, the link safety guarantee includes a timestamp indicating an expiration of the link safety guarantee. In another example, the link safety guarantee includes a hash of a Uniform Resource Locator (URL) associated with the link.

In another form, a method is provided that includes receiving, from a user device, a request to verify that a link to a resource is safe; determining whether a data store includes an entry associated with the link; determining that the link is safe when the data store includes the entry associated with the link; generating a link safety guarantee when it is determined that the link is safe; and transmitting the link safety guarantee to the user device.

In one example, the method further includes transmitting a request to a web risk service to verify that the link is safe when the data store does not include the entry associated with the link; and determining that the link is safe based on a response from the web risk service. In another example, determining that the link is safe further includes determining that the data store includes the entry associated with the link; determining that the entry has not expired; and determining that the link is safe when it is determined that the entry has not expired.

In another example, the request includes authorization information associated with a user of the user device and a uniform resource locator (URL) corresponding to the link. In another example, the link safety guarantee includes a signature signed by a private key. In another example, the link safety guarantee includes an expiration timestamp.

In yet another form, an apparatus is provided including: a memory storing instructions; and a processor, wherein the processor is configured to execute the instructions to perform operations including: receiving a link to a resource;

transmitting a request to a client link service to determine whether the link is safe; receiving a response indicating that the link is safe and including a link safety guarantee; and transmitting the link and the link safety guarantee to one or more second user devices.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, at a first user device, an input from a user of the first user device, the input including a link to a resource;
   transmitting, by the first user device, a request to a client link service to determine whether a web risk service has indicated that the link is safe;
   receiving, at the first user device, a response indicating that the link is safe and including a link safety guarantee, the link safety guarantee including a signature signed by a private key associated with the client link service; and
   transmitting the link and the link safety guarantee to one or more second user devices, wherein the one or more second user devices verify the signature using a public key associated with the client link service.

2. The method of claim 1, wherein transmitting the link and the link safety guarantee includes transmitting the link and including the link safety guarantee as an additional element when transmitting the link.

3. The method of claim 1, further comprising:
   displaying the link so that the link is selectable when the link is safe.

4. The method of claim 1, wherein the link safety guarantee includes a timestamp indicating an expiration of the link safety guarantee.

5. The method of claim 1, wherein the link safety guarantee includes a hash of a Uniform Resource Locator (URL) associated with the link.

6. A method comprising:
   receiving, at a client link service and from a user device, a request to verify that a web risk service has indicated that a link to a resource is safe;
   determining whether a data store of the client link service includes an entry associated with the link;
   determining that the link is safe when the data store includes the entry associated with the link;
   generating a link safety guarantee when it is determined that the link is safe, wherein the link safety guarantee includes a signature signed by a private key associated with the client link service; and
   transmitting the link safety guarantee to the user device.

7. The method of claim 6, further comprising:
   transmitting a request to the web risk service to verify that the link is safe when the data store does not include the entry associated with the link; and
   determining that the link is safe based on a response from the web risk service.

8. The method of claim 6, wherein determining that the link is safe further comprises:
   determining that the data store includes the entry associated with the link;
   determining that the entry has not expired; and
   determining that the link is safe when it is determined that the entry has not expired.

9. The method of claim 6, wherein the request includes authorization information associated with a user of the user device and a uniform resource locator (URL) corresponding to the link.

10. The method of claim 6, wherein the link safety guarantee includes an expiration timestamp.

11. An apparatus comprising:
    a memory storing instructions; and
    a processor, wherein the processor is configured to execute the instructions to perform operations comprising:
      receiving an input from a user, the input including a link to a resource;
      transmitting a request to a client link service to determine whether a web risk service has indicated that the link is safe;
      receiving a response indicating that the link is safe and including a link safety guarantee, wherein the link safety guarantee includes a signature signed by a private key associated with the client link service; and
      transmitting the link and the link safety guarantee to one or more second user devices, wherein the one or more second user devices verify the signature using a public key associated with the client link service.

12. The apparatus of claim 11, wherein the processor is configured to perform the operation of transmitting the link and the link safety guarantee by:
    transmitting the link and including the link safety guarantee as an additional element when transmitting the link.

13. The apparatus of claim 11, wherein the processor is further configured to perform operations comprising:
    displaying the link so that the link is selectable when the link is safe.

14. The apparatus of claim 11, wherein the link safety guarantee includes a timestamp indicating an expiration of the link safety guarantee.

15. The apparatus of claim 11, wherein the link safety guarantee includes a hash of a Uniform Resource Locator (URL) associated with the link.

16. The method of claim 1, wherein transmitting the request to the client link service includes transmitting the request to the client link service to determine whether a data store at the client link service stores an entry associated with the link.

17. The method of claim 16, wherein the data store stores entries associated with links that have been verified as safe by the web risk service.

18. The method of claim 6, wherein the data store stores entries associated with links that have been verified as safe by the web risk service.

19. The apparatus of claim 11, wherein the operation of transmitting the request to the client link service includes transmitting the request to the client link service to determine whether a data store at the client link service stores an entry associated with the link.

20. The apparatus of claim 19, wherein data store stores entries associated with links that have been verified as safe by the web risk service.

* * * * *